United States Patent

Winter et al.

Patent Number: 5,346,768
Date of Patent: Sep. 13, 1994

[54] SODA-LIME GLASS CONTAINING VANADIUM

[75] Inventors: Ernst Winter, Etzenricht; Friedrich Marwan; Joachim Bretschneider, both of Weiden; Hubert Drexler, Regensburg, all of Fed. Rep. of Germany

[73] Assignee: Flachglas AG, Fürth/Bavaria, Fed. Rep. of Germany

[21] Appl. No.: 865,075

[22] Filed: Apr. 8, 1992

[30] Foreign Application Priority Data

Apr. 10, 1991 [DE] Fed. Rep. of Germany ....... 4111702
Aug. 21, 1991 [EP] European Pat. Off. ............ 91114017

[51] Int. Cl.$^5$ .......................................... B32B 17/06
[52] U.S. Cl. ................................... 428/426; 428/411.1; 428/429; 428/430; 428/432; 428/446; 428/448; 428/921; 501/55; 501/68; 501/69; 501/70; 501/71; 501/72
[58] Field of Search ............... 501/55, 68, 69, 70, 501/71, 72; 428/426, 432, 429, 430, 446, 448, 921, 411.1

[56] References Cited

U.S. PATENT DOCUMENTS

| | | | |
|---|---|---|---|
| 1,957,279 | 5/1934 | Linke | 501/71 |
| 2,394,493 | 2/1946 | Schoenlaub | 501/71 |
| 2,581,440 | 1/1952 | Pincus | 501/71 |
| 2,676,109 | 4/1954 | Barnes et al. | 106/52 |
| 2,755,212 | 7/1956 | Brown | 501/70 |
| 2,860,059 | 11/1958 | Molter et al. | 106/52 |
| 3,858,964 | 1/1975 | Piesslinger | 501/70 |
| 4,701,425 | 10/1987 | Baker | 501/72 |

FOREIGN PATENT DOCUMENTS

| | | |
|---|---|---|
| 321297 | 6/1989 | European Pat. Off. |
| 916217 | 12/1953 | Fed. Rep. of Germany |
| 1496072 | 2/1972 | Fed. Rep. of Germany |
| 2006078 | 11/1976 | Fed. Rep. of Germany |
| 5247811 | 10/1975 | Japan |
| 5950045 | 9/1982 | Japan |
| 2048427 | 2/1990 | Japan |
| 708031 | 4/1954 | United Kingdom |

OTHER PUBLICATIONS

German Industrial Standard, DIN 5033, Sheet 3, Apr. 1972.
German Industrial Standard, DIN 5033, Sheet 1, Jul. 1970.
German Industrial Standard, DIN 5033, Sheet 2, Apr. 1972.
Chemical Abstracts, vol. 113, No. 20, 1990, 176954E of JP 2048427.
German Industrial Standard, DIN 1249, Part 10, Sep. 1988.
German Industrial Standard, DIN 67507, Jun. 1980.
German Industrial Standard, DIN 6174, Jan. 1979.
German Industrial Standard, DIN 5033, Sheet 9, Oct. 1970.
German Industrial Standard, DIN 5033, Sheet 8, Sep. 1966.
German Industrial Standard, DIN 5033, Sheet 7, Apr. 1972.
German Industrial Standard, DIN 5033, Sheet 5, May 1964.
German Industrial Standard, DIN 5033, Sheet 4, Aug. 1976.

Primary Examiner—Ellis P. Robinson
Assistant Examiner—Timothy M. Speer
Attorney, Agent, or Firm—Frishauf, Holtz, Goodman & Woodward

[57] ABSTRACT

A soda-lime glass containing vanadium which can be produced by the float process with high UV absorption for wavelengths below 350 nm. The glass comprises 70 to 74 weight % $SiO_2$, 0 to 2 weight % $Al_2O_3$, 0.1 weight % or less $Fe_2O_3$, 0 to 0.15 weight % $TiO_2$, 7.5 to 10 weight % CaO, 3.5 to 5.4 weight % MgO, 12 to 15 weight % $Na_2O$, 0 to 1 weight % $K_2O$, 0 to 0.02 weight % BaO, 0.1 to 0.3 weight % $SO_3$, 3 to 7 weight ppm CoO and 0.1 to 0.3 weight % $V_2O_5$.

16 Claims, 1 Drawing Sheet

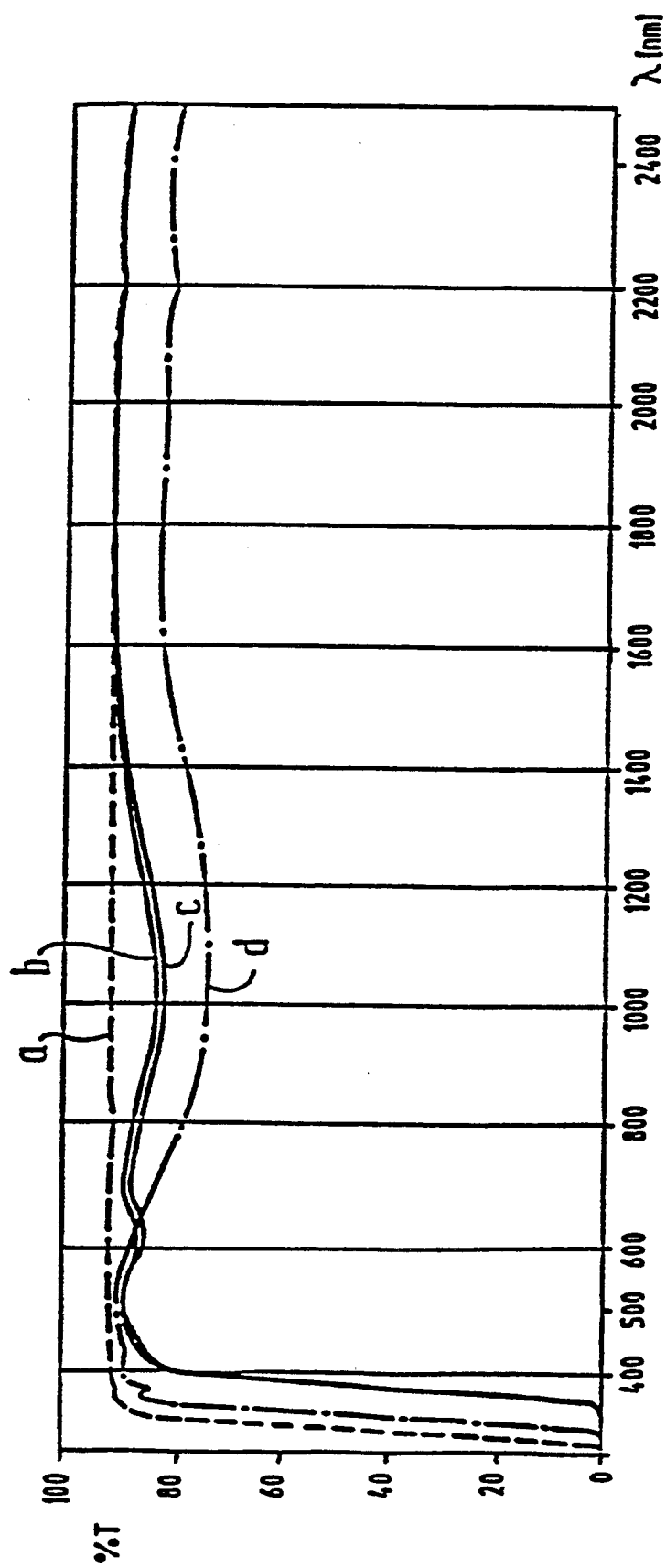

SODA-LIME GLASS CONTAINING VANADIUM

BACKGROUND OF THE INVENTION

1. Field of the Invention

The invention concerns a soda-lime glass containing vanadium, in particular a flat glass, produced by the float process with high UV absorption for wavelengths below 350 nm.

2. Background Information

Glasses with high UV absorption, high UV absorption being taken here to mean UV absorption up to about 90% of the UV radiation at wavelengths of below 400 nm, have until now been used only as flat glasses in isolated cases, preferably in the glass container industry for the manufacture of glass containers, such as bottles, in which UV-sensitive foodstuffs, such as, for example, milk, yogurt, juices containing vitamins or the like, are transported and stored.

For some time now, there has been considerable interest in flat glasses highly absorbent in the UV region, with high level of transmittance in the visible region, which are essentially neutral in color. By high level of transmittance is meant here the minimum transmittance values for nearly normal incidence for flat glass in building with planar parallel surfaces and different thickness are given by the following Table 1:

TABLE 1

Light transmittance and solar radiation transmittance for non-colored glasses with parallel flat surfaces

| thickness mm | light transmittance Value $\tau$ min. | radiation transmittance Value $\tau_e$ min. |
|---|---|---|
| 3 | 0.88 | 0.83 |
| 4 | 0.87 | 0.80 |
| 5 | 0.86 | 0.77 |
| 6 | 0.85 | 0.75 |
| 8 | 0.83 | 0.70 |
| 10 | 0.81 | 0.65 |
| 12 | 0.79 | 0.61 |
| 15 | 0.76 | 0.55 |
| 19 | 0.72 | 0.48 |

This interest concerns both glasses for the construction and the automotive sector, for example, in order to protect shop window displays from fading or also to protect plastic automotive interior materials from decomposition, premature aging and in particular, as well from color changes. A particular application for the use of UV-absorbent flat glasses is found in the manufacture of laminated glass window panes, in particular those with cast resin or fire protection interlayers.

These interlayers or the adhesives used therewith must at present still be provided with costly UV-resistant constituents, or, if this is not the case, it is also customary particularly in the case of waterglass-based fire protection interlayers, to provide UV-absorbent layers in a glass sandwich or to use these fire-retardant laminated glass panes only in building interiors, where no UV rays occur. Particularly UV-sensitive, for example, is glycerine, which is used inter alia in fire protection waterglass layers.

UV-absorbent soda-lime glasses have been described, for example, in JP-A 52-47 811, in which 0.035 to 0.12 weight % $V_2O_5$ have been used jointly with 0.006 to 0.08 weight % manganese oxide and less than 0.4 ppm $Co_2O_3$. This soda-lime glass does possess UV-absorption capability, but for color correction required—apart from iron—the use of three color-changing substances.

In addition, this is a glass mixture which contains $MnO_2$. Brownstone ($MnO_2$) cannot be used without problems under the process conditions of float glass manufacture, as for stabilization of $Mn^{3+}$ in the molten glass, pronouncedly oxidizing melting conditions are necessary, which can be achieved only with difficulty in the melting end of a floating plant. At least partial reduction of the manganese to form practically colorless $Mn^{2+}$ can thus hardly be avoided with the float process.

In addition, it is known that in the course of time glasses containing $Mn^{2+}$ "solarize", i.e., redox reactions are triggered by UV light, during which, due, for example, to $Fe^{3+}$ ions present in the glass—or also due to other oxidizing constituents—the color less $Mn^{2+}$ is oxidized to form violet-tinting $Mn^{3+}$. This means that the hue of glasses containing $Mn^{2+}$ gradually changes under the influence of UV light.

As an alternative to $MnO_2$, selenium oxide is used, but selenium oxide is to be avoided on account of its environmental pollution and toxicity. In addition, selenium has a tendency to sublimate, so that it is necessary to implement extensive emission control measures. In JP-A 59-50 045, a soda-lime glass with high UV and IR absorption has been proposed, which used 0.05 to 1.0 weight % $V_2O_5$, 0.2 to 0.5 $Fe_2O_3$ and 0 to 5 weight % $TiO_2$ in a glass compound as coloring component, whereby this glass possesses at least 50% transmittance for radiation in the visible region and up to 75% transmittance for solar radiation. This glass absorbs radiation below 370 nm almost completely, as a result of which fading and photoreactions of articles protected by this glass can be prevented. A disadvantage of this glass lies in the fact that its transmittance is adequate only for radiation in the visible region. The teaching given there for production of a UV-absorbent float glass with high transmittance in the visible region, which is essentially neutral in color, is insufficient however.

From GB-PS 708 031, a soda-lime glass (crown glass) with a refractive index of about 1,523 is known, this can be used as optical glass or glass with special refractive properties and has been designed for the production of spectacle glasses and the like. In the case of this application, UV absorption is desirable for protection of the eye. This glass possesses no UV transmittance at least 75%. To achieve these properties, 0.2 to 1.2 weight % vanadium oxide together with at least one additional color modifying metal oxide, selected from the group of iron, cobalt, copper, chromium, tin, arsenic, antimony, manganese, as well as other constituents, has been used.

This glass does in fact possess good UV-absorbent properties with simultaneously satisfactory transmittance in the visible region; the glass is not, however, suitable for manufacture of flat glasses, in particular by the floating process, as it does not possess the viscosity and floating properties necessary for the float glass process. The manganese oxide proposed for color matching cannot be employed in the float glass process for the reasons stated above.

In addition, UV-absorbent borosilicate glasses are known from EP-C 0 321 297, which possess a combination of color-changing additives, selected from the group consisting of cerium oxide, manganese oxide, iron oxide, cobalt oxide, copper oxide, vanadium oxide, molybdenum oxide. The glass proposed there, particularly for the manufacture of automotive windshields is costly to produce, as the boron materials to be used are expensive. These tend to volatilize and form environmentally pollutant emissions which, on account of the high cost involved in eliminating these emissions, should be avoided. EP-C 0321 297 does not provide a precise recommendation as to how vanadium oxide can be combined with other metal oxides to prevent UV transmittance; it is recommended that the costly oxides of the rare earths, for example, cerium or even lanthanum should be used to improve the absorption behavior, so that the use of vanadium oxides is stated solely as an optional additional possibility, but without any information as to the quantity it is used jointly with other pigments. Float glass compounds cannot be produced by this means.

DE-C 20 06 078 concerns sheet glasses to reduce transmittance in the visible and infrared spectral region, which incorporate a mixture of copper oxide, vanadium pentoxide, ferric oxide, nickel oxide and cobalt oxide, whereby the sum of these colorific components, whose proportion in relation to one another can be varied, is at least 2.9 weight % of the glass mixture. The special high-flatness glass which can be produced by this method is too cost intensive for the manufacture of float glass and is developed here for the special application of production of magnetic/optical storage plates. Naturally, little importance is attached to maximum neutrality of color.

A UV-absorbent display window pane is known from DE-C 916 217, whereby for absorption of short wave radiation below about 400 nm it is proposed that about 2 weight % cerium or titanium oxide be added to the normal display window glass composition.

From DE-C 14 96 072, a filter glass with a very high silicic acid content of 96 weight % is known, where pronounced UV absorption is achieved by means of $V_2O_5$ as an additive together with cerium nitrate and titanium dioxide. The high silicate content glasses cannot be processed by the float glass method.

In U.S. Pat. No. 2,860,059, a UV-absorbent glass is described which has a cerium oxide content of 0.05 to 0.5 weight % $CeO_2$ and 0.2 to 0.6 weight % $Fe_2O_3$. This glass is expensive to manufacture on account of the high cerium content. The high iron content leads to unfavorable transmittance values.

Accordingly, UV-absorbent glasses of widely differing types have heretofore been known, but as yet no UV-absorbent glasses with high transmittance in the visible region, which are suitable for the cost effective manufacture of float glass in large quantities.

In this connection, the following is a brief description of the preferred flat glass production process, which represents the state of the art.

With the float glass process, the molten glass is passed to a floating bath of molten tin, on which it floats. As protection against oxidation of the tin, the process is carried out in a reducing inert gas atmosphere.

On account of this reducing atmosphere, the use of various additives, which can be employed in conventional flat glass not produced by the float glass process, is not possible. Thus, it is not permissible to use lead, nickel or copper oxides or similar oxides as additives, as these will be reduced to the metal on the surface of the glass ribbon. The use of aluminum oxide to ensure the hydrolytic stability of the glass and also to control the viscosity of the molten glass and the use of sodium oxide for liquefaction of the molten glass is also important, so that only very precisely adjusted glasses can be used. The tin bath has a temperature gradient of 600° to 1100° C., whereby at the end of it at 600° C., the floating glass ribbon is lifted off and slowly cooled.

SUMMARY OF THE INVENTION

The purpose of the present invention is to provide a simply and cost effectively producible flat glass, in particular a glass produced by the float glass process with high UV absorption without reduction of the neutrality of color or significant reduction of the total light transmittance (as defined in DIN 1249, Part 10).

The aforementioned problems are solved by the present invention by means of a soda-lime glass containing vanadium, in particular a flat glass produced by the float glass process with high UV absorption for wavelengths below 350 nm, which contains between 70 and 74 weight % $SiO_2$, 0 to 2 weight % $Al_2O_3$, 0.1 weight % or less $Fe_2O_3$, 0 to 0.15 weight % $TiO_2$, 7.5 to 10 weight % CaO, 3.5 to 5.4 weight % MgO, 12.0 to 15.0 weight % $Na_2O$, 0 to 1 weight % $K_2O$, 0 to 0.02 weight % BaO, 0.1 to 0.3 weight % $SO_3$, 3 to 7 weight ppm CoO and 0.10 to 0.3 weight % $V_2O_5$, whereby the sum of all weight percentages should always be 100.

The present invention also relates to a multi-layered glazing system comprising (a) at least one UV-sensitive layer of a polymer selected from the group consisting of organic polymers, inorganic polymers and combinations thereof and (b) at least one layer of a glass as described herein.

BRIEF DESCRIPTION OF THE DRAWING

FIG. 1 is a graph showing transmittance spectra for various known flat glasses in comparison with the UV inhibiting glass according to the present invention.

With respect of a glass with a thickness of 4 mm, a to d in FIG. 1 are for the following:

| | | |
|---|---|---|
| a) EX. 6 | 0.015 wt. % $Fe_2O_3$ | |
| b) EX. 1 | 0.03 wt. % $Fe_2O_3$: 0.2 wt. % $V_2O_5$: 5 ppm Co O | |
| c) EX. 2 | 0.05 wt. % $Fe_2O_3$: 0.2 wt. % $V_2O_5$: 5 ppm Co O | |
| d) EX. 5 | 0.11 wt. % $Fe_2O_3$. | |

DETAILED DESCRIPTION OF THE INVENTION

One embodiment of the present invention concerns a soda-lime glass containing vanadium, processable by the float-process, with a high absorption for wavelengths below 350 nm, which comprises 70 to 74 weight % $SiO_2$, 0.01 to 2 weight % $Al_2O_3$, about 0.005 to about 0.1 weight % $Fe_2O_3$, 0.01 to 0.15 weight % $TiO_2$, 7.5 to 10 weight % CaO, 3.5 to 5.4 weight % MgO, 12 to 15 weight % $Na_2O$, 0.01 to 1 weight % $K_2O$, 0.01 to 0.02 weight % BaO, 0.1 to 0.3 weight % $SO_3$, 3 to 7 ppm CoO, and 0.1 to 0.3 weight % $V_2O_5$.

In a preferred embodiment, the soda-lime glass contains 71 and 73 weight % $SiO_2$, 0.55 to 0.75 weight % $Al_2O_3$, less than about 0.07 weight % $Fe_2O_3$, 0 to 0.12 weight % $TiO_2$, 8.0 to 9.0 weight % CaO, 4.0 to 4.5 weight % MgO, 12.5 to 14.0 weight % $Na_2O$, 0.2 to 0.4 weight % $K_2O$, 0 to 0.02 weight % BaO, 0.15 to 0.25 weight % $SO_3$, 4 to 6 weight ppm CoO and 0.18 to 0.22 weight % $V_2O_5$, whereby the sum of all weight percentages should always be 100.

A preferred glass contains 72.5 to 72.7 weight % $SiO_2$, 0.55 to 0.75 weight % $Al_2O_3$, less than about 0.06 weight % $Fe_2O_3$, 0 to 0.12 weight % $TiO_2$, 8.4 to 8.8 weight % CaO, 4 to 4.44 weight % MgO, 12.9 to 13.2 weight % Na₂O, 0.2 to 0.4 weight % K₂O, 0 to 0.01 weight % BaO, 0.17 to 0.22 weight % SO₃, 5 weight ppm CoO and 0.19 to 0.21 weight % V₂O₅, whereby the sum of all weight percentages should always be 100.

A preferred use of the glass is for multilayer glazing systems, in particular those with UV-sensitive layers of organic and/or inorganic polymers, or with UV-sensitive bonding compounds. The glass according to the invention also makes it possible to employ reasonably priced non-UV-absorbent layers, films and/or adhesives in glass products as, by virtue of the use of the UV-inhibiting glass according to the invention, the effect of the UV radiation on these UV-sensitive components can be prevented.

A typical application is its use for fire resistant panes. A further application is its use for one- and multilayer glazing systems for automobiles.

According to the invention, it is now possible to provide a UV-absorbent float glass, where it is possible in a surprising way to dispense with the use of toxic and environmentally pollutant colorific constituents such as selenium, whereby it is possible to avoid implementing costly emission protection measures. According to the invention, for the first time only two components, that is to say V₂O₅ and CoO are employed to obtain neutral color properties, whereby control of the manufacturing process is significantly simplified. It could also be achieved by means of cerium oxide, but this is detrimental in that about five times the quantity of cerium is required to achieve the same absorption effect than is the case with vanadium oxide—whereby the use of vanadium oxide has inter alia the advantage of higher cost effectiveness.

The iron content of the glass has to be matched carefully, as an excessively high iron content in combination with V₂O₅ leads to a yellow tint. On the other hand, it has long been known that too low an iron content leads to low IR absorption and thus to an undesirable temperature gradient in the molten glass, combined with significantly higher bottom temperatures in the melting end. This results in quality deterioration of the molten glass on account of excessive bottom temperatures in the melting end. These opposing effects require optimum adjustment of the iron content which, on account of the coloration, should be less than 0.06 weight % but, for reasons of IR absorption, should be above the content corresponding to the content of "white glass" (=0.02 weight % Fe₂O₃). By virtue of the fact that the glass according to the invention possesses absorption over the entire IR range, it is possible to obtain a better float glass. In addition, the iron content proposed also has the effect that the material cost of the glass mixture is more favorable than for essentially non-ferrous glasses, as non-ferrous sands are more expensive than sands with negligible iron content.

Thus, the presence of a slight quantity of iron in the glass is thoroughly desirable and improves processability.

The invention will be explained in detail below with reference to the following examples.

EXAMPLE 1

Neutral colored, UV radiation absorbent float glass

A glass consisting of 72.55 weight % SiO₂, 0.63 weight % Al₂O₃, 0.03 weight % Fe₂O₃, 0.11 weight % TiO₂, 8.67 weight % CaO, 4.32 weight % MgO, 12.99 weight % Na₂O, 0.3 weight % K₂O, 0.19 weight % SO₃, 0.01 weight % BaO, 0.2 weight % V₂O₅ and 5 weight ppm CoO was produced and processed by the float glass process to form glass with a thickness of 4 mm.

The float glass produced in this way possessed a UVB transmittance value of 0.00%, a UVA transmittance value of 10%, a UV total transmittance value of 9% and a $T_L$ (eye*D65) value of 88%; $T_E$ (CIE) was 83% and $T_E$(MOON 2) was 86%. The solar transmittance values are defined as follows:

The light transmittance value $\tau$ is calculated according to the formula:

$$\tau = \frac{\int_{\lambda=380\,nm}^{780\,nm} S_\lambda \cdot \tau(\lambda) \cdot V(\lambda) \cdot d\lambda}{\int_{\lambda=380\,nm}^{780\,nm} S_\lambda \cdot V(\lambda) \cdot d\lambda} \approx \frac{\sum_{\lambda=380\,nm}^{780\,nm} S_\lambda \cdot \tau(\lambda) \cdot V(\lambda) \cdot \Delta\lambda}{\sum_{\lambda=380\,nm}^{780\,nm} S_\lambda \cdot V(\lambda) \cdot \Delta\lambda}$$

and relates to visible radiation only, $S_\lambda$ is the radiation function of the light D65
$\tau(\lambda)$ is the spectral transmittance degree of the glass
$V(\lambda)$ is the sensitivity of the human eye at daylight, The solar radiation transmittance value $\tau_e$ of glass for global radiation can be calculated according to the formula:

$$\tau_e = \frac{\int_{\lambda=0}^{\infty} S_\lambda \cdot \tau(\lambda) \cdot d\lambda}{\int_{\lambda=0}^{\infty} S_\lambda \cdot d\lambda} \approx \frac{\sum_{\lambda=0}^{\infty} S_\lambda \cdot \tau(\lambda) \cdot \Delta\lambda}{\sum_{\lambda=0}^{\infty} S_\lambda \cdot \Delta\lambda}$$

wherein
$S_\lambda$ is the radiation function of the global radiation (Table 2) and
$\tau(\lambda)$ is the spectral transmittance degree of the glass.

TABLE 2

| Radiation function of global radiation | |
|---|---|
| λ nm | $S_\lambda$ |
| 300 | 0.005 |
| 340 | 0.024 |
| 380 | 0.032 |
| 420 | 0.050 |
| 460 | 0.065 |
| 500 | 0.063 |
| 540 | 0.058 |
| 580 | 0.054 |
| 620 | 0.055 |
| 660 | 0.049 |
| 700 | 0.046 |
| 740 | 0.041 |
| 780 | 0.037 |
| 900 | 0.139 |
| 1100 | 0.097 |
| 1300 | 0.058 |
| 1500 | 0.039 |
| 1700 | 0.026 |
| 1900 | 0.018 |
| 2500 | 0.044 |

TABLE 3

Solar Radiation function of global radiation in the UV-range

| λ nm | $S_\lambda$ |
|---|---|
| 297.5 | 0.00082 |
| 302.5 | 0.00461 |
| 307.5 | 0.01373 |
| 312.5 | 0.02746 |
| 317.5 | 0.04120 |
| 322.5 | 0.05591 |
| 327.5 | 0.06572 |
| 332.5 | 0.07062 |
| 337.5 | 0.07258 |
| 342.5 | 0.07454 |
| 347.5 | 0.07601 |
| 352.5 | 0.07700 |
| 357.5 | 0.07896 |
| 362.5 | 0.08043 |
| 367.5 | 0.08337 |
| 372.5 | 0.08631 |
| 377.5 | 0.09073 |

Further a UV-transmittance value is defined by:

$$\tau_{UV} = \frac{\int_{\lambda=280\,nm}^{380\,nm} S_\lambda \cdot \tau(\lambda) \cdot d\lambda}{\int_{\lambda=280\,nm}^{380\,nm} S_\lambda \cdot d\lambda} \approx \frac{\sum_{\lambda=280\,nm}^{380\,nm} S_\lambda \cdot \tau(\lambda) \cdot \Delta\lambda}{\sum_{\lambda=280\,nm}^{380\,nm} S_\lambda \cdot \Delta\lambda}$$

that is valid for radiation in the whole W-range from 280 nm to 380 nm. This UV-transmittance value may be splitted up into $$\tau_{UVA} = \frac{\int_{\lambda=315\,nm}^{380\,nm} S_\lambda \cdot \tau(\lambda) \cdot d\lambda}{\int_{\lambda=315\,nm}^{380\,nm} S_\lambda \cdot d\lambda} \approx \frac{\sum_{\lambda=315\,nm}^{380\,nm} S_\lambda \cdot \tau(\lambda) \cdot \Delta\lambda}{\sum_{\lambda=315\,nm}^{380\,nm} S_\lambda \cdot \Delta\lambda}$$

for radiation with the wavelength from 315 to 380 nm and $$\tau_{UVB} = \frac{\int_{\lambda=280\,nm}^{315\,nm} S_\lambda \cdot \tau(\lambda) \cdot d\lambda}{\int_{\lambda=280\,nm}^{315\,nm} S_\lambda \cdot d\lambda} \approx \frac{\sum_{\lambda=280\,nm}^{315\,nm} S_\lambda \cdot \tau(\lambda) \cdot \Delta\lambda}{\sum_{\lambda=280\,nm}^{315\,nm} S_\lambda \cdot \Delta\lambda}$$

for radiation with wavelengths within the range 280 to 315 nm.

The wavelength range from 280 to 315 nm is called UVA and has mainly negative effects, e.g. bleaching of dyes and burning of skin. The radiation with a wavelength from 315 to 380 is called UVB and leads to bronzing of the skin only.

In most cases only $\tau_{uv}$ is relevant, but sometimes it is interesting to split the value into $\tau_{uva}$ and $\tau_{uvb}$.

TABLE 4 product of the radiation function of standard light D65 and of the spectral light sensitivity $V(\lambda)$:

| λ nm | $S_\lambda \cdot V(\lambda)$ |
|---|---|
| 380 | 0.0000 |
| 390 | 0.0005 |
| 400 | 0.0030 |
| 410 | 0.0103 |
| 420 | 0.0352 |
| 430 | 0.0948 |
| 440 | 0.2274 |
| 450 | 0.4192 |
| 460 | 0.6663 |
| 470 | 0.9850 |
| 480 | 1.5189 |
| 490 | 2.1336 |
| 500 | 3.3491 |
| 510 | 5.1393 |
| 520 | 7.0523 |
| 530 | 8.7990 |
| 540 | 9.4427 |
| 550 | 9.8077 |
| 560 | 9.4306 |
| 570 | 8.6891 |
| 580 | 7.8994 |
| 590 | 6.3306 |
| 600 | 5.3542 |
| 610 | 4.2491 |
| 620 | 3.1502 |
| 630 | 2.0812 |
| 640 | 1.3810 |
| 650 | 0.8070 |
| 660 | 0.4612 |
| 670 | 0.2485 |
| 680 | 0.1255 |
| 690 | 0.0536 |
| 700 | 0.0276 |
| 710 | 0.0146 |
| 720 | 0.0057 |
| 730 | 0.0035 |
| 740 | 0.0021 |
| 750 | 0.0008 |
| 760 | 0.0001 |
| 770 | 0.0000 |
| 780 | 0.0000 |

Transmittance means $T = I/I_o$, wherein $I_o$ is the intensity of light entering a sample and I is the light emerging from the sample.

The color coordinates in the 2° field of view, D65, were:
X: 83.0
Y: 88.5
Z: 94.8
L*: 95.3
A*: −2.0
B*: 1.0

The light used is the standard light D65 which has been introduced by the Commission Internationale de lEclairage (CIE). The standard color values X,Y,Z and the color values L*, a*, b* that form the basis for the color distance formula have the following relations:
L* = 116A*-16
a* = 500(X*-Y*)
b* = 200(Y*-Z*)
whereas $X^* = \sqrt[3]{X/X_n}$ for $X/X_n > 0{,}008856$ and $X^* = 7{,}787\,(X/X_n) + 0{,}138$ for $X/X_n \leq 0{,}008856$ $Y^* = \sqrt[3]{Y/Y_n}$ for $Y/Y_n > 0{,}008856$ and -continued $$Y^* = 7{,}787\,(Y/Y_n) + 0{,}138 \text{ for } Y/Y_n \leq 0{,}008856$$

$$Z^* = \sqrt[3]{Z/Z_n} \text{ for } Z/Z_n > 0{,}008856 \text{ and}$$

$$Z^* = 7{,}787\,(Z/Z_n) + 0{,}138 \text{ fir } Z/Z_n \leq 0{,}008856$$

|  | 2°-standard spectator | | | 10°-standard spectator | | |
|---|---|---|---|---|---|---|
|  | light | | | | | |
|  | D65 | C | A | D65 | C | A |
| $X_n$ | 95.05 | 98.07 | 109.85 | 94.81 | 97.28 | 111.14 |
| $Y_n$ | 100.00 | 100.00 | 100.00 | 100.00 | 100.00 | 100.00 |
| $Z_n$ | 108.90 | 118.22 | 35.58 | 107.34 | 116.14 | 35.20 |

$X_n$, $Y_n$, $Z_n$ are the standard color values of the completely white area for the kind of light and the standard view that was used for the standard color values X,Y,Z. Standard color values are given in Table 6 below:

TABLE 6

Standard color value parts of the different kinds of standard light and standard color values of the completely white area for different kinds of standard lights for 2° field of view:

| standard light | light | x | y | z | $X_w$ | $Y_w$ | $Z_w$ |
|---|---|---|---|---|---|---|---|
| A | — | 0,4476 | 0,4074 | 0,1450 | 109,85 | 100,00 | 35,58 |
| C | — | 0,3101 | 0,3162 | 0,3737 | 98,07 | 100,00 | 118,22 |
| D65 | — | 0,3127 | 0,3290 | 0,3583 | 95,05 | 100,00 | 108,90 |
| — | B | 0,3484 | 0,3516 | 0,3000 | 99,09 | 100,00 | 85,31 |
| — | G | 0,4898 | 0,4149 | 0,0953 | 118,04 | 100,00 | 22,96 |
| — | P | 0,5376 | 0,4113 | 0,0511 | 130,73 | 100,00 | 12,43 |
| — | Xe | 0,3188 | 0,3184 | 0,3628 | 100,11 | 100,00 | 113,94 |
| — | D55 | 0,3324 | 0,3474 | 0,3202 | 95,67 | 100,00 | 92,15 |
| — | D75 | 0,2990 | 0,3149 | 0,3861 | 94,96 | 100,00 | 122,62 |
| colour of the spectrum of the same energy (no kind of light) | — | 0,3333 | 0,3333 | 0,3333 | 100,00 | 100,00 | 100,00 |

TABLE 7

Spectral radiation distribution standard light $S_{\lambda,A}$ $S_{\lambda,D65}$, $S_{\lambda,C}$

| λ nm | $S_{\lambda,A}$ | $S_{\lambda,D65}$ | $S_{\lambda,C}$ |
|---|---|---|---|
| 300 | 0.93 | 0.03 |  |
| 305 | 1.23 | 1.7 |  |
| 310 | 1.36 | 3.3 |  |
| 315 | 1.62 | 11.8 |  |
| 320 | 1.93 | 20.2 | 0.01 |
| 325 | 2.27 | 28.6 | 0.20 |
| 330 | 2.66 | 37.1 | 0.40 |
| 335 | 3.10 | 38.5 | 1.55 |
| 340 | 3.59 | 39.9 | 2.70 |
| 345 | 4.14 | 42.4 | 4.85 |
| 350 | 4.74 | 44.9 | 7.00 |
| 355 | 5.41 | 45.8 | 9.95 |
| 360 | 6.14 | 46.6 | 12.90 |
| 365 | 6.95 | 49.4 | 17.20 |
| 370 | 7.82 | 52.1 | 21.40 |
| 375 | 8.77 | 51.0 | 27.50 |
| 380 | 9.80 | 50.0 | 33.00 |
| 385 | 10.90 | 52.3 | 39.92 |
| 390 | 12.09 | 54.6 | 47.40 |
| 395 | 13.35 | 68.7 | 55.17 |
| 400 | 14.71 | 82.8 | 63.30 |
| 405 | 16.15 | 87.1 | 71.81 |
| 410 | 17.68 | 91.5 | 80.60 |
| 415 | 19.29 | 92.5 | 89.53 |
| 420 | 21.00 | 93.4 | 98.10 |
| 425 | 22.79 | 90.1 | 105.80 |
| 430 | 24.67 | 86.7 | 112.40 |
| 435 | 26.64 | 95.8 | 117.75 |
| 440 | 28.70 | 104.9 | 121.50 |
| 445 | 30.85 | 110.9 | 123.45 |
| 450 | 33.09 | 117.0 | 124.00 |
| 455 | 35.41 | 117.4 | 123.60 |
| 460 | 37.81 | 117.8 | 123.10 |
| 465 | 40.30 | 116.3 | 123.30 |
| 470 | 42.87 | 114.9 | 123.80 |
| 475 | 45.52 | 115.4 | 124.09 |
| 480 | 48.24 | 115.9 | 123.90 |
| 485 | 51.04 | 112.4 | 122.92 |
| 490 | 53.91 | 108.8 | 120.70 |
| 495 | 56.85 | 109.1 | 116.90 |
| 500 | 59.86 | 109.4 | 112.10 |
| 505 | 62.93 | 108.6 | 106.98 |
| 510 | 66.06 | 107.8 | 102.30 |
| 515 | 69.25 | 106.3 | 98.81 |
| 520 | 72.50 | 104.8 | 96.90 |
| 525 | 75.79 | 106.2 | 96.78 |
| 530 | 79.13 | 107.7 | 98.00 |
| 535 | 82.52 | 106.0 | 99.94 |
| 540 | 85.95 | 104.4 | 102.10 |
| 545 | 89.41 | 104.2 | 103.95 |
| 550 | 92.91 | 104.0 | 105.20 |
| 555 | 96.44 | 102.0 | 105.67 |
| 560 | 100.00 | 100.0 | 105.30 |
| 565 | 103.58 | 98.2 | 104.11 |
| 570 | 107.18 | 96.3 | 102.30 |
| 575 | 110.80 | 96.1 | 100.15 |
| 580 | 114.44 | 95.8 | 97.80 |
| 585 | 118.08 | 92.2 | 95.43 |
| 590 | 121.73 | 88.7 | 93.20 |
| 595 | 125.39 | 89.3 | 91.22 |
| 600 | 129.04 | 90.0 | 89.70 |
| 605 | 132.70 | 89.8 | 88.83 |
| 610 | 136.35 | 89.6 | 88.40 |
| 615 | 139.99 | 88.6 | 88.19 |
| 620 | 143.62 | 87.7 | 88.10 |
| 625 | 147.23 | 85.5 | 88.06 |
| 630 | 150.84 | 83.3 | 88.00 |
| 635 | 154.42 | 83.5 | 87.86 |
| 640 | 157.98 | 83.7 | 87.80 |
| 645 | 161.52 | 81.9 | 87.99 |
| 650 | 165.03 | 80.0 | 88.20 |
| 655 | 168.51 | 80.1 | 88.20 |
| 660 | 171.96 | 80.2 | 87.90 |
| 665 | 175.38 | 81.2 | 87.22 |
| 670 | 178.77 | 82.3 | 86.30 |
| 675 | 182.12 | 80.3 | 85.30 |
| 680 | 185.43 | 78.3 | 84.00 |
| 685 | 188.70 | 74.0 | 82.21 |
| 690 | 191.93 | 69.7 | 80.20 |
| 695 | 195.12 | 70.7 | 78.24 |
| 700 | 198.26 | 71.6 | 76.30 |
| 705 | 201.36 | 73.0 | 74.36 |
| 710 | 204.41 | 74.3 | 72.40 |
| 715 | 207.41 | 68.0 | 70.40 |
| 720 | 210.36 | 61.6 | 68.30 |
| 725 | 213.27 | 65.7 | 66.30 |
| 730 | 216.12 | 69.9 | 64.40 |
| 735 | 218.92 | 72.5 | 62.80 |

TABLE 7-continued

| λ nm | Spectral radiation distribution standard light $S_{\lambda,A}$ $S_{\lambda,D65}$, $S_{\lambda,C}$ | | |
|---|---|---|---|
| | $S_{\lambda,A}$ | $S_{\lambda,D65}$ | $S_{\lambda,C}$ |
| 740 | 221.67 | 75.1 | 61.50 |
| 745 | 224.36 | 69.3 | 60.20 |
| 750 | 227.00 | 63.6 | 59.20 |
| 755 | 229.58 | 55.0 | 58.20 |
| 760 | 232.11 | 46.4 | 58.10 |
| 765 | 234.59 | 56.6 | 58.00 |
| 770 | 237.01 | 66.8 | 58.20 |
| 775 | 239.37 | 65.1 | 58.50 |
| 780 | 241.67 | 63.4 | 59.10 |

The 2° standard valency system:
The 2° standard spectral value functions $\bar{x}(\lambda)$, $\bar{y}(\lambda)$, $\bar{z}(\lambda)$ give the color values of spectral radiation of the small wavelength interval $\lambda \pm \Delta\lambda/2$ at the same band width $\Delta\lambda$ and the same radiation values:

$$\int_{1-\frac{\Delta\lambda}{2}}^{1+\frac{\Delta\lambda}{2}} S_\lambda \cdot d\lambda = \text{const}$$

for the standard spectator.
The standard color values X,Y,Z of a combined radiation (radiation excitation function ) may be calculated by:

$$X = k \int_K^L \phi_\lambda \bar{x}(\lambda) d\lambda \quad Y = k \int_K^L \phi_\lambda \bar{y}(\lambda) d\lambda \quad Z = k \int_K^L \phi_\lambda \bar{z}(\lambda) d\lambda$$

Integration is to be made from K=360 nm to L=830 nm, if necessary; for most practical cases it is sufficient to take the range from 380 to 780 nm into consideration. In practice the integrals are substituted by sums. The numbers of the 2°—standard spectral value functions may be taken from Table 1 for $\Delta\lambda=5$ nm and 380 to 780 nm. Table 8 contains the 2° standard spectral value parts $\bar{x}(\lambda), \bar{y}(\lambda)$.

The units for the three 2° standard spectral value functions are selected such that for the color valency E of a color excitation with a radiation wavelength-independent radiation function have practically the same 2° color values. The 2° standard color value Y is proportional to the photometrical size of the color excitation.

TABLE 8

| λ nm | Standard Spectral Values | | | Standard Spectral Values Parts | | |
|---|---|---|---|---|---|---|
| | $\bar{x}(\lambda)$ | $\bar{y}(\lambda)$ | $\bar{z}(\lambda)$ | $\bar{x}(\lambda)$ | $\bar{y}(\lambda)$ | $\bar{z}(\lambda)$ |
| 380 | 0,0014 | 0,0000 | 0,0065 | 0,1741 | 0,0050 | 0,8209 |
| 385 | 0,0022 | 0,0001 | 0,0105 | 0,1740 | 0,0050 | 0,8210 |
| 390 | 0,0042 | 0,0001 | 0,0201 | 0,1738 | 0,0049 | 0,8213 |
| 395 | 0,0076 | 0,0002 | 0,0362 | 0,1736 | 0,0049 | 0,8215 |
| 400 | 0,0143 | 0,0004 | 0,0579 | 0,1733 | 0,0048 | 0,8219 |
| 405 | 0,0232 | 0,0006 | 0,1102 | 0,1730 | 0,0048 | 0,8222 |
| 410 | 0,0435 | 0,0012 | 0,2074 | 0,1726 | 0,0048 | 0,8226 |
| 415 | 0,0776 | 0,0022 | 0,3713 | 0,1721 | 0,0048 | 0,8231 |
| 420 | 0,1344 | 0,0040 | 0,6456 | 0,1714 | 0,0051 | 0,8235 |
| 425 | 0,2148 | 0,0073 | 1,0391 | 0,1703 | 0,0058 | 0,8239 |
| 430 | 0,2839 | 0,0116 | 1,3856 | 0,1689 | 0,0069 | 0,8242 |
| 435 | 0,3285 | 0,0168 | 1,6230 | 0,1669 | 0,0086 | 0,8245 |
| 440 | 0,3483 | 0,0230 | 1,7471 | 0,1644 | 0,0109 | 0,8247 |
| 445 | 0,3481 | 0,0298 | 1,7826 | 0,1611 | 0,0138 | 0,8251 |
| 450 | 0,3362 | 0,0380 | 1,7721 | 0,1566 | 0,0177 | 0,8257 |
| 455 | 0,3187 | 0,0480 | 1,7441 | 0,1510 | 0,0227 | 0,8263 |
| 460 | 0,2908 | 0,0600 | 1,6692 | 0,1440 | 0,0297 | 0,8263 |
| 465 | 0,2511 | 0,0739 | 1,5281 | 0,1355 | 0,0399 | 0,8246 |
| 470 | 0,1954 | 0,0910 | 1,2876 | 0,1241 | 0,0578 | 0,8181 |
| 475 | 0,1421 | 0,1126 | 1,0419 | 0,1096 | 0,0868 | 0,8036 |
| 480 | 0,0956 | 0,1390 | 0,8130 | 0,0913 | 0,1327 | 0,7760 |
| 485 | 0,0580 | 0,1693 | 0,6162 | 0,0687 | 0,2007 | 0,7306 |
| 490 | 0,0320 | 0,2080 | 0,4652 | 0,0454 | 0,2950 | 0,6596 |
| 495 | 0,0147 | 0,2586 | 0,3533 | 0,0235 | 0,4127 | 0,5638 |
| 500 | 0,0049 | 0,3230 | 0,2720 | 0,0082 | 0,5384 | 0,4534 |
| 505 | 0,0024 | 0,4073 | 0,2123 | 0,0039 | 0,6548 | 0,3413 |
| 510 | 0,0093 | 0,5030 | 0,1582 | 0,0139 | 0,7502 | 0,2359 |
| 515 | 0,0291 | 0,6082 | 0,1117 | 0,0389 | 0,8120 | 0,1491 |
| 520 | 0,0633 | 0,7100 | 0,0782 | 0,0743 | 0,8338 | 0,0919 |
| 525 | 0,1096 | 0,7932 | 0,0573 | 0,1142 | 0,8262 | 0,0596 |
| 530 | 0,1655 | 0,8620 | 0,0422 | 0,1547 | 0,8059 | 0,0394 |
| 535 | 0,2257 | 0,9149 | 0,0298 | 0,1929 | 0,7816 | 0,0255 |
| 540 | 0,2904 | 0,9540 | 0,0203 | 0,2296 | 0,7543 | 0,0161 |
| 545 | 0,3597 | 0,9803 | 0,0134 | 0,2658 | 0,7243 | 0,0099 |
| 550 | 0,4334 | 0,9950 | 0,0087 | 0,3016 | 0,6923 | 0,0061 |
| 555 | 0,5121 | 1,0000 | 0,0057 | 0,3373 | 0,6589 | 0,0038 |
| 560 | 0,5945 | 0,9950 | 0,0039 | 0,3731 | 0,6245 | 0,0024 |
| 565 | 0,6784 | 0,9786 | 0,0027 | 0,4087 | 0,5896 | 0,0017 |
| 570 | 0,7621 | 0,9520 | 0,0021 | 0,4441 | 0,5547 | 0,0012 |
| 575 | 0,8425 | 0,9154 | 0,0018 | 0,4788 | 0,5202 | 0,0010 |
| 580 | 0,9163 | 0,8700 | 0,0017 | 0,5125 | 0,4866 | 0,0009 |
| 585 | 0,9786 | 0,8163 | 0,0014 | 0,5448 | 0,4544 | 0,0008 |
| 590 | 1,0263 | 0,7570 | 0,0011 | 0,5752 | 0,4242 | 0,0006 |
| 595 | 1,0567 | 0,6949 | 0,0010 | 0,6029 | 0,3965 | 0,0006 |
| 600 | 1,0622 | 0,6310 | 0,0008 | 0,6270 | 0,3725 | 0,0005 |
| 605 | 1,0456 | 0,5668 | 0,0006 | 0,6482 | 0,3514 | 0,0004 |
| 610 | 1,0026 | 0,5030 | 0,0003 | 0,6658 | 0,3340 | 0,0002 |
| 615 | 0,9384 | 0,4412 | 0,0002 | 0,6801 | 0,3197 | 0,0002 |
| 620 | 0,8544 | 0,3810 | 0,0002 | 0,6915 | 0,3083 | 0,0002 |
| 625 | 0,7514 | 0,3210 | 0,0001 | 0,7006 | 0,2993 | 0,0001 |
| 630 | 0,6424 | 0,2650 | 0,0000 | 0,7079 | 0,2920 | 0,0001 |
| 635 | 0,5419 | 0,2170 | 0,0000 | 0,7140 | 0,2859 | 0,0001 |
| 640 | 0,4479 | 0,1750 | 0,0000 | 0,7190 | 0,2809 | 0,0001 |
| 645 | 0,3608 | 0,1382 | 0,0000 | 0,7230 | 0,2770 | 0,0000 |
| 650 | 0,2835 | 0,1070 | 0,0000 | 0,7260 | 0,2740 | 0,0000 |
| 655 | 0,2187 | 0,0816 | 0,0000 | 0,7283 | 0,2717 | 0,0000 |
| 660 | 0,1649 | 0,0610 | 0,0000 | 0,7300 | 0,2700 | 0,0000 |
| 665 | 0,1212 | 0,0446 | 0,0000 | 0,7311 | 0,2689 | 0,0000 |
| 670 | 0,0874 | 0,0320 | 0,0000 | 0,7320 | 0,2680 | 0,0000 |
| 675 | 0,0636 | 0,0232 | 0,0000 | 0,7327 | 0,2673 | 0,0000 |
| 680 | 0,0468 | 0,0170 | 0,0000 | 0,7334 | 0,2666 | 0,0000 |
| 685 | 0,0329 | 0,0119 | 0,0000 | 0,7340 | 0,2660 | 0,0000 |
| 690 | 0,0227 | 0,0082 | 0,0000 | 0,7344 | 0,2656 | 0,0000 |
| 695 | 0,0158 | 0,0057 | 0,0000 | 0,7346 | 0,2654 | 0,0000 |
| 700 | 0,0114 | 0,0041 | 0,0000 | 0,7347 | 0,2653 | 0,0000 |
| 705 | 0,0081 | 0,0029 | 0,0000 | 0,7347 | 0,2653 | 0,0000 |
| 710 | 0,0058 | 0,0021 | 0,0000 | 0,7347 | 0,2653 | 0,0000 |
| 715 | 0,0041 | 0,0015 | 0,0000 | 0,7347 | 0,2653 | 0,0000 |
| 720 | 0,0029 | 0,0010 | 0,0000 | 0,7347 | 0,2653 | 0,0000 |
| 725 | 0,0020 | 0,0007 | 0,0000 | 0,7347 | 0,2653 | 0,0000 |
| 730 | 0,0014 | 0,0005 | 0,0000 | 0,7347 | 0,2653 | 0,0000 |
| 735 | 0,0010 | 0,0004 | 0,0000 | 0,7347 | 0,2653 | 0,0000 |
| 740 | 0,0007 | 0,0002 | 0,0000 | 0,7347 | 0,2653 | 0,0000 |
| 745 | 0,0005 | 0,0002 | 0,0000 | 0,7347 | 0,2653 | 0,0000 |
| 750 | 0,0003 | 0,0001 | 0,0000 | 0,7347 | 0,2653 | 0,0000 |
| 755 | 0,0002 | 0,0001 | 0,0000 | 0,7347 | 0,2653 | 0,0000 |
| 760 | 0,0002 | 0,0001 | 0,0000 | 0,7347 | 0,2653 | 0,0000 |
| 765 | 0,0001 | 0,0000 | 0,0000 | 0,7347 | 0,2653 | 0,0000 |
| 770 | 0,0001 | 0,0000 | 0,0000 | 0,7347 | 0,2653 | 0,0000 |
| 775 | 0,0001 | 0,0000 | 0,0000 | 0,7347 | 0,2653 | 0,0000 |
| 780 | 0,0000 | 0,0000 | 0,0000 | 0,7347 | 0,2653 | 0,0000 |

Sum
over 5-nm intervals
$\Sigma \bar{x}(\lambda) = 21,3714$
$\Sigma \bar{y}(\lambda) = 21,3711$
$\Sigma \bar{z}(\lambda) = 21,3715$
Sum
over 10-nm intervals
$\Sigma \bar{x}(\lambda) = 10,6836$
$\Sigma \bar{y}(\lambda) = 10,6856$
$\Sigma \bar{z}(\lambda) = 10,6770$ The transmittance spectrum of this float glass is shown in Curve b in, FIG. 1 and it is apparent that a pronounced absorption edge occurs in the region of 350 nm, as well as slightly increased IR absorption in the region of 1050 nm.

EXAMPLE 2

Neutral colored; UV radiation absorbent float glass

A glass consisting of 72.53 weight % $SiO_2$, 0.63 weight % $Al_2O_3$, 0.05 weight % $Fe_2O_3$, 0.11 weight % $TiO_2$, 8.67 weight % CaO, 4.32 weight % MgO, 12.99 weight % $Na_2O$, 0.3 weight % $K_2O$, 0.19 weight % $SO_3$, 0.01 weight % BaO, 0.2 weight % $V_2O_5$ and 5 weight ppm CoO was produced and processed by the float glass process to form glass with a thickness of 4 mm.

The float glass produced in this way possessed a UVB transmittance value of 0.00%, a UVA transmittance value of 10%, a UV total transmittance value of 9% and a $T_L$ (eye*D65) value of 87%; $T_E$ (CIE) was 83% and $T_E$ (MOON 2) was 85%.

The transmittance spectrum of this float glass is shown in Curve c in FIG. 1 and it is apparent that a pronounced absorption edge occurs in the region of 350 nm, as well as slightly increased IR absorption in the region of 1050 nm.

The color coordinates in the 2° field of view, D65, were:
X: 82.3
Y: 87.9
Z: 93.6
L*: 95.0
A*: −2.4
B*: 1.4

Example 3

Neutral colored, UV radiation absorbent float glass

A glass consisting of 72.7 weight % $SiO_2$, 0.73 weight % $Al_2O_3$, 0.05 weight % $Fe_2O_3$, 0.04 weight % $TiO_2$, 8.4 weight % CaO, 4 weight % MgO, 12.9 weight % $Na_2O$, 0.4 weight % $K_2O$, 0.22 weight % $SO_3$, 0.2 weight % $V_2O_5$ and 5 weight ppm CoO was produced and processed by the float glass process to form glass with a thickness of 4 mm.

The float glass produced in this way possessed a UVB transmittance value of 0.00%, a UVA transmittance value of 8.12 %, a UV total transmittance value of 7.74% and a TL (eye*D65) value of 87.2%; $T_E$ (CIE) was 81.47% and TE (MOON 2) was 83.71%.

The transmittance spectrum of this float glass is shown in Curve c in FIG. 1 and it is apparent that a pronounced absorption edge occurs in the region of 350 nm, as well as slightly increased IR absorption in the region of 1050 nm.

The color coordinates in the 2° field of view, D65, were:
X: 81.335
Y: 87.195
Z: 91.933
L*: 94.821
A*: −2.986
B*: 2.05

EXAMPLE 4

Float glass containing vanadium pentoxide, tinted

A glass consisting of 72.53 weight % $SiO_2$, 0.63 weight % $Al_2O_3$, 0.05 weight % $Fe_2O_3$, 0.11 weight % $TiO_2$, 8.67 weight % CaO, 4.32 weight % MgO, 12.99 weight % $Na_2O$, 0.3 weight % $K_2O$, 0.19 weight % $SO_3$, 0.01 weight % BaO, 0.2 weight % $V_2O_5$ without CoO was produced and processed by the float glass process to form glass with a thickness of 4 mm.

The float glass produced in this way possessed a UVB transmittance value of 0.00%, a UVA transmittance value of 10%, a UV total transmittance value of 9% and a $T_L$ (eye*D65) value of 89%; $T_E$ (CIE) was 84% and $T_E$ (MOON 2) was 86%.

The color coordinates in the 2° field of view, D65, were:
X: 83.7
Y: 89.4
Z: 94.2
L*: 95.7
A*: −2.3
B*: 2.1

It can be seen that a slightly tinted glass is obtained.

EXAMPLE 5

Comparative test with float glass

A glass consisting of 72.70 weight % $SiO_2$, 0.60 weight % $Al_2O_3$, 0.11 weight % $Fe_2O_3$, 0.10 weight % $TiO_2$, 8.79 weight % CaO, 4.19 weight % MgO, 13.0 weight % $Na_2O$, 0.3 weight % $K_2O$, 0.2 weight % $SO_3$, 0.01 weight % BaO was produced and processed by the float glass process to form a layer thickness of 4 mm.

The float glass produced in this way possessed a UVB transmittance value of 0.1%, a UVA transmittance value of 60%, a UV total transmittance value of 58% and a $T_L$ (eye*D65) value of 89%; $T_E$ (CIE) was 82% and TE (MOON 2) was 83%.

The color coordinates in the 2° field of view, D65, were:
X: 84.3
Y: 89.6
Z: 97.3
L*: 95.8
A*: −1.5
B*: 0.2

The transmittance spectrum of this float glass is shown in Curve d in FIG. 1 and it is apparent that no absorption edge occurs in the region of 350 nm but that, on account of the relatively high iron content, increased IR absorption in the region of 1050 nm.

EXAMPLE 6

Comparative test with white float glass

A glass consisting of 72.30 weight % $SiO_2$, 0.60 weight % $Al_2O_3$, 0.015 weight % $Fe_2O_3$, 0.40 weight % $TiO_2$, 8.80 weight % CaO, 4.17 weight % MgO, 13.10 weight % $Na_2O$, 0.40 weight % $K_2O$, 0.2 weight % $SO_3$, 0.01 weight % BaO was produced and processed by the float glass process to form a layer thickness of the glass pane of 4 mm.

The float glass produced in this way possessed a UVB transmittance value of 25%, a UVA transmittance value of 82%, a UV total transmittance value of 79% and a $T_L$ (eye*D65) value of 91%; $T_E$ (CIE) was 91% and $T_E$ (MOON 2) was 91%.

The color coordinates in the 2° field of view, D65, were:
X: 86.9
Y: 91.6
Z: 99.2
L*: 96.6
A*: −0.2
B*: 0.3

The transmittance spectrum of this float glass is shown in Curve a in FIG. 1 and it is apparent that no absorption edge occurs in the region of 350 nm and that, on account of the relatively high iron content, practically no increased IR absorption in the region of 1050 nm.

From the above, it is clear that the UV-absorbent glasses according to the invention of Examples 1 to 3 possess significantly improved absorption behavior in the UV region over the comparative test glasses, but have the effect of being practically neutral in color in the visible region.

EXAMPLE 7

Fire resistant glass

A multi-pane laminated glass was produced in the known manner with the following structure: 2 outer panes with a thickness of 4 mm and sodium silicate as a fire retardant layer. Here, the glass of Example 1 was used as at least one outer glass pane. The glass sandwich produced thus having an area of 30 cm×30 cm was then exposed to irradiation on a radiation wall with 43 UV lamps each of 300 W output and increased emission in the range of below 350 nm, with a lamp-to-glass distance of 1 m. In addition, a laminated glass pane was produced using conventional float glass in accordance with Comparative Example 6 without increased UV absorption and exposed to the same irradiation. After irradiation extending over 100 hours, decomposition of the waterglass layer was found in the case of the laminated glass pane with the conventional glass, while the laminated glass pane according to the invention remained clear.

EXAMPLE 8

Laminated glass

A laminated glass was produced in the known manner, in the form of a multi-pane laminated glass with the following structure: 2 outer panes with a thickness of 4 mm with an aromatic polymer as an adhesive. Here, the glass of Example 1 was used as at least one outer glass pane. The glass sandwich produced was then exposed to irradiation on a radiation wall with 43 UV lamps each of 300 W output and increased emission in the range of below 350 nm, placed at a distance of 0.5 m from the glass. In addition, a laminated glass pane was produced using conventional float glass in accordance with Comparative Example 6 without increased UV absorption and exposed to the same irradiation. After irradiation extending over 100 hours, decomposition of the polymer layer was found in the case of the laminated glass pane with the conventional glass, while the laminated glass pane according to the invention remained clear. Thus, it was also possible for the first time in a surprising manner to employ adhesives of the aromatic polymer group, which possess particularly favorable properties as regards thermal stability, in laminated glass arrangements.

It will be appreciated that the instant specification is set forth by way of illustration and not limitation, and that various modifications and changes may be made without departing from the spirit and scope of the present invention.

What is claimed is:

1. A soda-lime glass containing vanadium processable by the float process, with an UV absorption up to about 90% of the UV radiation for wavelengths of below 350 nm, comprising 70 to 74 weight % $SiO_2$, 0 to 2 weight % $Al_2O_3$, 0.1 weight % or less $Fe_2O_3$, 0 to 0.15 weight % $TiO_2$, 7.5 to 10 weight % CaO, 3.5 to 5.4 weight % MgO, 12 to 15 weight % $Na_2O$, 0 to 1 weight % $K_2O$, 0 to 0.02 weight % BaO, 0.1 to 0.3 weight % $SO_3$, 3 to 7 ppm CoO and 0.1 to 0.3 weight % $V_2O_5$, whereby the sum of all weight percentages is 100%.

2. The glass according to claim 1, wherein the glass comprises 70 to 74 weight % $SiO_2$, 0.01 to 2 weight % $Al_2O_3$, about 0.005 to about 0.1 weight % $Fe_2O_3$, 0.01 to 0.15 weight % $TiO_2$, 7.5 to 10 weight % CaO, 3.5 to 5.4 weight % MgO, 12 to 15 weight % $Na_2O$, 0.01 to 1 weight % $K_2O$, 0.01 to 0.03 weight % $SO_3$, 3 to 7 weight ppm CoO and 0.1 to 0.3 weight % $V_2O_5$.

3. The glass according to claim 1, wherein the $TiO_2$ is in an amount of 0.01 to 0.15 weight %.

4. The glass according to claim 1, wherein the $K_2O$ is in an amount of 0.01 to 1 weight %.

5. The glass according to claim 1, wherein the BaO is in an amount of 0.01 to 0.02 weight %.

6. The glass according to claim 1, wherein the $Al_2O_3$ is in an amount of 0.01 to 2 weight %.

7. The glass according to claim 1, wherein the $Fe_2O_3$ is in an amount of 0.005 to 0.1 weight %.

8. The glass according to claim 1, wherein the glass comprises 72.5 to 72.7 weight % $SiO_2$, 0.55 to 0.75 weight % $Al_2O_3$, less than about 0.06 weight % $Fe_2O_3$, 0 to 0.12 weight % $TiO_2$, 8.4 to 8.8 weight % CaO, 4 to 4.44 weight % MgO, 12.9 to 13.2 weight % $Na_2O$, 0.2 to 0.4 weight % $K_2O$, 0 to 0.01 weight % BaO, 0.17 to 0.22 weight % $SO_3$, 5 weight ppm CoO and 0.19 to 0.21 weight % $V_2O_5$.

9. The glass according to claim 1, wherein the glass consists essentially of 72.55 weight % $SiO_2$, 0.63 weight % $Al_2O_3$, 0.03 weight % $Fe_2O_3$, 0.11 weight % $TiO_2$, 8.67 weight % CaO, 4.32 weight % MgO, 12.99 weight % $Na_2O$, 0.3 weight % $K_2O$, 0.19 weight % $SO_3$, 0.01 weight % BaO, 0.2 weight % $V_2O_5$ and 5 ppm CoO.

10. The glass according to claim 1, wherein the glass consists essentially of 72.53 weight % $SiO_2$. 0.63 weight % $Al_2O_3$, 0.05 weight % $Fe_2O_3$, 0.11 weight % $TiO_2$, 8.67 weight % CaO, 4.32 weight % MgO, 12.99 weight % $Na_2O$, 0.3 weight % $K_2O$, 0.19 weight % $SO_3$, 0.01 weight % BaO, 0.2 weight % $V_2O_5$ and 5 ppm CoO.

11. The glass according to claim 1, wherein the glass consists essentially of 72.7 weight % $SiO_2$, 0.73 weight % $Al_2O_3$, 0.05 weight % $Fe_2O_3$, 0.04 weight % $TiO_2$, 8.4 weight % CaO, 4 weight % MgO, 12.9 weight % $Na_2O$, 0.4 weight % $K_2O$, 0.22 weight % $SO_3$, 0.2 weight % $V_2O_5$ and 5 ppm CoO.

12. A multilayered glazing system comprising (a) at least one UV-sensitive layer of a polymer selected from the group consisting of organic polymers, inorganic polymers and combinations thereof and (b) at least one layer of a glass according to claim 1.

13. The multilayer glazing system according to claim 12, which is fire resistant and which further comprises a fire retardant layer.

14. The multilayer glazing system according to claim 13, wherein the fire retardant layer is interposed between two outer panes wherein at least one of said outer panes comprises said glass and wherein said fire retardant layer comprises sodium silicate.

15. In an automobile glazing system, wherein the improvement comprises said glazing system being a multilayer glazing system comprising (a) at least one UV-sensitive layer of a polymer selected from the group consisting of organic polymers, inorganic polymers and combinations thereof and (b) at least one layer of a glass according to claim 1.

16. The glass according to claim 1, wherein the glass comprises 71 to 73 weight % $SiO_2$, 0.55 to 0.75 weight % $Al_2O_3$, less than about 0.07 weight % $Fe_2O_3$, 0 to 0.12 weight % $TiO_2$, 8 to 9 weight % CaO, 4.0 to 4.5 weight % MgO, 12.5 to 14.0 weight % $Na_2O$, 0.2 to 0.4 weight % $K_2O$, 0 to 0.02 weight % BaO, 0.15 to 0.25 weight % $SO_3$, 4 to 6 ppm CoO and 0.18 to 0.22 weight % $V_2O_5$.

\* \* \* \* \*